United States Patent
Vallez

(10) Patent No.: US 10,759,458 B1
(45) Date of Patent: Sep. 1, 2020

(54) WHEELBARROW FOR SPREADING A MATERIAL

(71) Applicant: Bernard Vallez, Salles sur l'Hers (FR)

(72) Inventor: Bernard Vallez, Salles sur l'Hers (FR)

( * ) Notice: Subject to any disclaimer, the term of this patent is extended or adjusted under 35 U.S.C. 154(b) by 0 days.

(21) Appl. No.: 16/368,612

(22) Filed: Mar. 28, 2019

(51) Int. Cl.
  *B62B 1/18* (2006.01)
  *E01H 10/00* (2006.01)
  *E01C 19/20* (2006.01)

(52) U.S. Cl.
  CPC .......... *B62B 1/18* (2013.01); *E01C 19/2005* (2013.01); *E01H 10/007* (2013.01)

(58) Field of Classification Search
  CPC .................................... B62B 1/24; B62B 1/18
  See application file for complete search history.

(56) References Cited

U.S. PATENT DOCUMENTS

| | | | | |
|---|---|---|---|---|
| 4,327,541 A | * | 5/1982 | Emory | A01C 15/00 111/200 |
| 5,493,852 A | * | 2/1996 | Stewart | A01D 43/14 56/16.8 |
| 6,089,478 A | * | 7/2000 | Truan | E01C 19/203 239/661 |
| 6,527,205 B2 | * | 3/2003 | Andersson | A01C 7/044 239/656 |
| 7,334,803 B2 | * | 2/2008 | Gonzalez | B62B 1/22 280/47.17 |
| D629,018 S | * | 12/2010 | Loxton | D15/27 |
| 9,320,202 B2 | * | 4/2016 | Houseman | A01D 43/00 |
| 2005/0229844 A1 | * | 10/2005 | Leach | A01C 15/16 118/110 |
| 2016/0144757 A1 | | 5/2016 | Romas et al. | |

FOREIGN PATENT DOCUMENTS

DE   202011106085 U1   11/2011

* cited by examiner

*Primary Examiner* — John D Walters
*Assistant Examiner* — James J Triggs
(74) *Attorney, Agent, or Firm* — Christensen O'Connor Johnson Kindness PLLC

(57) ABSTRACT

A wheelbarrow for spreading a material is provided. The wheelbarrow generally includes a bucket configured to contain at least one material and having an opening through which the material is configured to flow, a controllable closing flap configured to close the second opening, and a distribution plate extending under the opening. The distribution plate is positioned such that material flowing gravitationally through the opening travels along the distribution plate towards an application surface exterior to the bucket of the wheelbarrow. The distribution plate may include guide channels configured to distribute the material across a width of the distribution plate as the material travels along the distribution plate.

9 Claims, 3 Drawing Sheets

WHEELBARROW FOR SPREADING A MATERIAL

BACKGROUND

A conventional wheelbarrow comprises a bucket, a chassis with two arms forming shafts, foot rests, and a bearing system at the front of the wheelbarrow. Such wheelbarrows are generally used for the manual transport of materials. Conventional wheelbarrows are particularly used to transport a material which must be spread over a surface requiring application. For example, a classic wheelbarrow may be used for transporting gravel which must be spread on a freshly tarmacked road. When the material is brought close to the surface requiring the coating, an individual can then tip up the bucket of the wheelbarrow so the contents are emptied onto a section of the surface requiring the application and then spread the material over the surface using an additional tool such as a rake or a spade. This is often difficult for the individual to carry out as the weight of the bucket filled with material is often very heavy.

Some conventional wheelbarrows facilitate the task of tipping the bucket for the user as it comprises a system for assisting with tipping the bucket at the front of the wheelbarrow thanks to a handle fixed to the back of the bucket and at least one gas spring exerting pressure under the back of the bucket. The technique of spreading using this wheelbarrow still requires a large amount of time, particularly to spread the material after having turned it onto a section of the surface requiring an application.

Another method of spreading material is to bring the wheelbarrow close to the spreading zone and then, using an additional tool such as a spade, to spread the pellets bit by bit over the zone requiring the application. This spreading method has the disadvantage of taking a large amount of time and being less precise in terms of controlling the amount of material spread per unit area.

Another conventional wheelbarrow is a hand-operated snow shovel for sweeping snow from a surface. The snow shovel comprises a chassis to which two arms are attached for handling the snow shovel by hand and at least one wheel for moving the snow shovel. The snow shovel particularly comprises a dispersing container mounted on the chassis, said container comprising an opening in the lower zone with an adjustable flap through which a material contained by the dispersing container may flow at an adjustable rate. The snow shovel also comprises a distribution plate under the opening of the container rotatably supported around a vertical axis and a rotation mechanism of the distribution plate mounted so that when said at least one wheel turns, the distribution plate is rotated around its vertical axis. When the snow shovel moves forwards or backwards, the material which is flowing from the opening of the lower zone of the distribution container thus falls onto the rotating distribution plate and is projected perpendicularly to the axis of rotation of the plate.

Such a snow shovel device is not suitable for spreading a material precisely. In fact, spreading by projection perpendicular to the axis of rotation of the plate when said plate is rotating seems imprecise because it does not allow the spreading to be channeled in one direction. It is therefore difficult to carry out precise and homogeneous spreading on surfaces requiring an application and particularly comprising corners defined by the boundaries of said surface, such as the raised edges of earthworks or a path.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure relates to a wheelbarrow for spreading a material, and the use of said wheelbarrow for spreading a material, particularly a granular material.

According to one or more aspects of the present disclosure, wheelbarrow for spreading a material is provided. The wheelbarrow generally includes a bucket intended to contain at least one material, said bucket comprising a base wall, a front wall, a rear wall, two side walls and a first upper opening, a second opening in said base wall and/or the front wall through which the material is intended to flow, a closing flap closing the second opening, and means for controlling the opening of said closing flap. The wheelbarrow may further comprise a distribution plate in a generally rectangular shape and extending longitudinally according to a longitudinal axis parallel to a transverse axis of the wheelbarrow, under the whole length of the second opening, said plate being positioned under the second opening so that when a material flows gravitationally through the opening, said material flows onto the plate along its surface across its width towards a surface requiring an application under the wheelbarrow or in front of the wheelbarrow.

The wheelbarrow according to the present disclosure allows gaining time during the spreading of material on a surface as the user no longer needs to place the wheelbarrow next to the surface requiring the application and carry out the spreading with an additional tool such as a shovel. The user may directly spread the material with the wheelbarrow simply by opening the closing flap while moving forwards with the wheelbarrow over the surface requiring the application. Furthermore, this allows the quantity of material spread per unit area to be controlled in a more precise manner compared to spreading with another tool such as the shovel and thus saves material. The wheelbarrow according to the present disclosure has the specific advantage of sparing its user considerable effort in tipping the bucket forward in order to empty its contents through its upper opening onto the surface requiring the application. Finally, the wheelbarrow according to the present disclosure has the advantage of being easy to use even for a person who is not used to handling this type of tool. This wheelbarrow is easy to transport from one work site to another compared to the motor vehicles typically used for spreading, which are heavy and imposing in size. The wheelbarrow according to the present disclosure is moreover much more manageable than such vehicles and allows some areas which are difficult to access, for example the edges and corners of some surfaces requiring application where walls are located, to be accessed.

The distribution plate allows spreading by simple gravity in front of or under the wheelbarrow, which provides a precise spreading direction and boundary. In fact, the flow of materials thus spread only by gravity flow along the surface of said plate across its width is spread in a very precise way with respect to the spreading, which allows the devices of the prior art to be implemented. The wheelbarrow that is the subject matter of the present disclosure thus allows spreading a material in a precise and homogeneous manner, for example in corners and recesses of a surface requiring an application.

According to one embodiment, the present disclosure also displays the following features, implemented separately or in each of their technically effective combinations.

In a particular embodiment, the second opening extends longitudinally between the two side walls according to an axis parallel to the transverse axis of the wheelbarrow. The material spreading surface capacity is thus advantageously wide according to the distance separating the side walls of the wheelbarrow In a particular embodiment, the means for controlling the opening of the closing flap comprise a cable connected to an operable controlling element at a first end of the cable and connected to the closing flap at a second end of the cable. An example of a cable used in the present disclosure is a Bowden cable.

In a particular embodiment, the connection of the cable to the closing flap is implemented by a set of connecting rods in which a first connecting rod is connected to a second connecting rod, said second connecting rod being connected to the closing flap so that when the manual controlling element is operated, the closing flap opens the second opening.

In a particular embodiment, the operable controlling element is manually operable.

In a particular embodiment, the wheelbarrow comprises at least two shafts and the operable controlling element is positioned on one of the shafts.

In a particular embodiment, the operable controlling element is a lever.

In a particular embodiment, the closing flap is fixed to the bucket in a rotatably moveable fashion around an axis parallel to a transverse axis of the wheelbarrow.

In a particular embodiment, the distribution plate comprises guide channels positioned so as to distribute the flow of material on the surface of the distribution plate in a homogeneous manner when said material flows along the surface of said plate. Such channels advantageously allow the flow of material on the surface of the plate to be distributed all along said plate. This then further improves the homogeneity of the spreading of the material on the surface requiring spreading.

According to another aspect, the present disclosure relates to the use of the wheelbarrow, the subject matter of the present disclosure, for spreading a granular material.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1A:
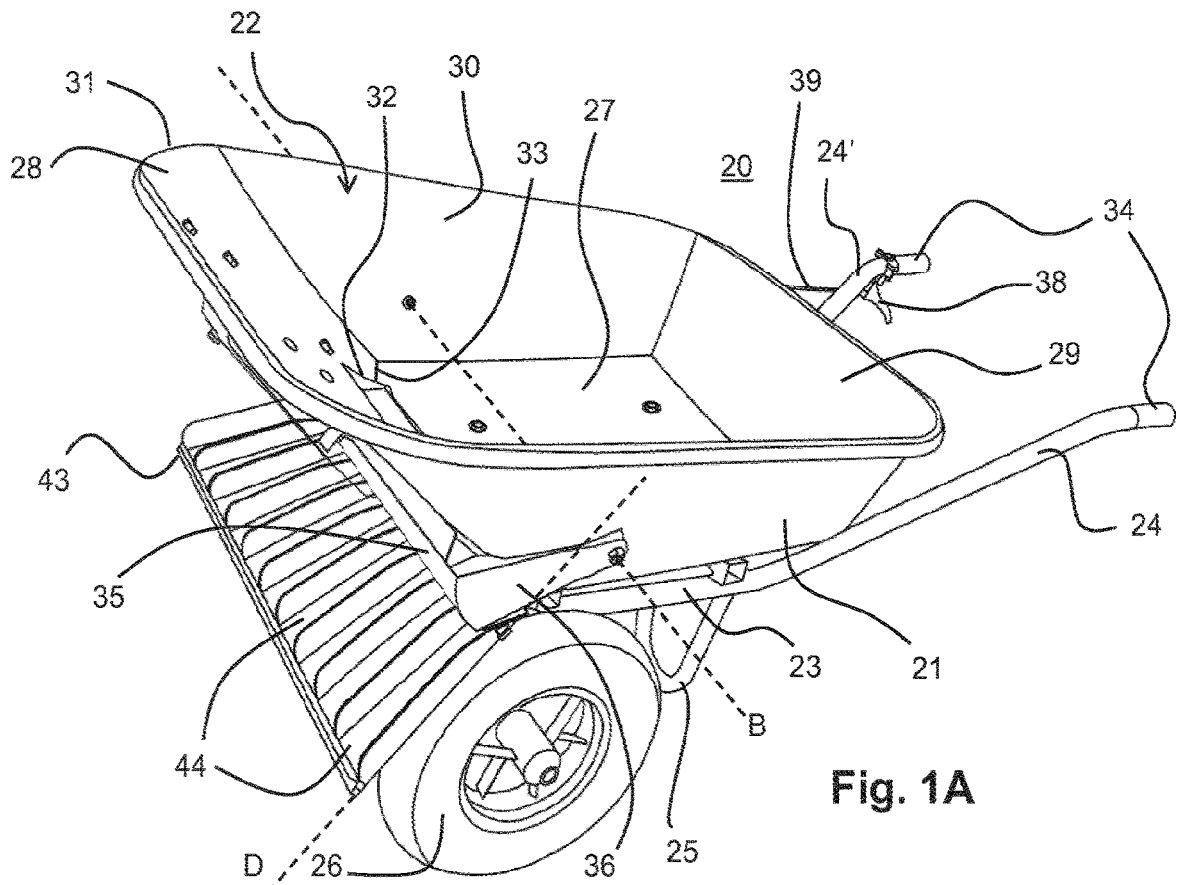
FIG. 1A is a perspective view of a representative embodiment of a wheelbarrow in accordance with aspects of the present disclosure.
Figure 1B:
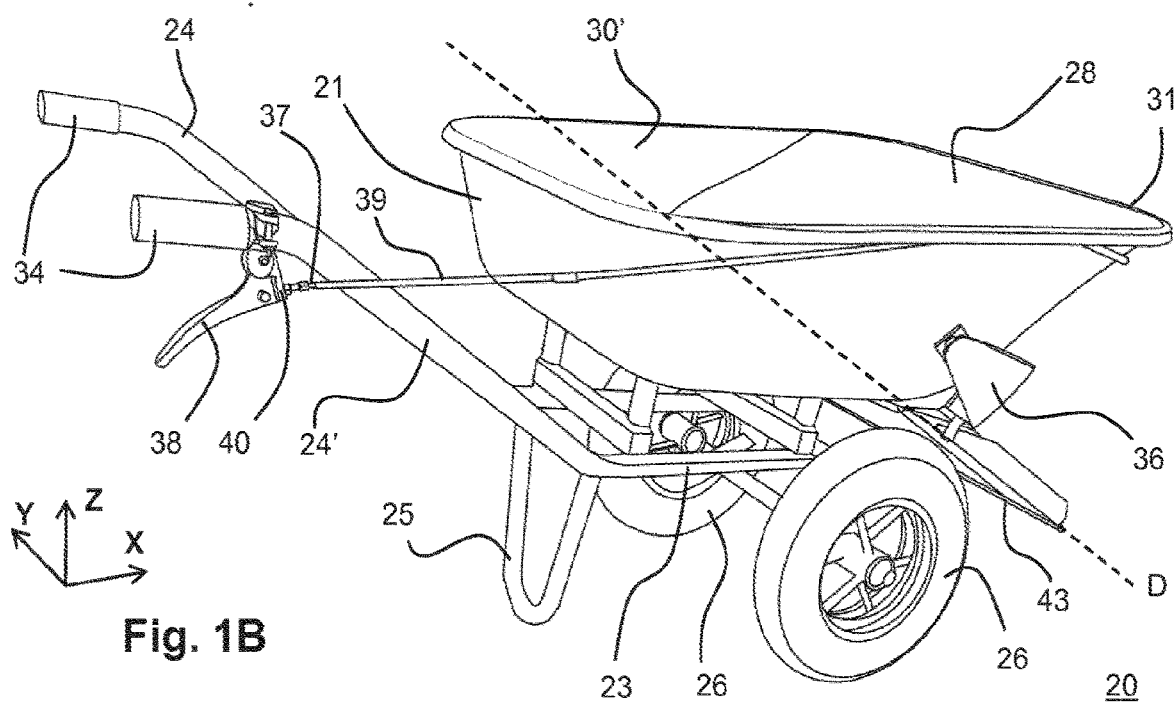
FIG. 1B is another perspective view of the wheelbarrow of FIG. 1A.

The present disclosure relates to a wheelbarrow for the spreading of a material on an application surface, such as the ground. FIGS. 1A and 1B show a wheelbarrow 20 according to an embodiment of the present disclosure. Said wheelbarrow 20 comprises a bucket 21 comprising a first upper opening 22, said bucket 21 intended to contain said material, a chassis 23, two shafts 24 and 24', at least one foot 25, and at least one wheel 26. In the embodiment shown in FIGS. 1A and 1B, the wheelbarrow 20 comprises two wheels 26.

As used in the present disclosure, the term "in front of the wheelbarrow" is intended to mean beyond the front of the wheelbarrow, i.e. beyond the most forward material point of the wheelbarrow with respect to the direction of travel of the wheelbarrow.

In the present disclosure, a Cartesian coordinate associated with the wheelbarrow 20 according to the present disclosure is considered, comprising an X axis parallel to a longitudinal axis of the idle wheelbarrow 20, that is parallel to the advance direction of the wheelbarrow 20, a Y axis parallel to a transverse axis of the wheelbarrow 20, orthogonal to the X axis and extending from one side of the wheelbarrow 20 to the other, and a vertical Z axis. The X and Y axes are substantially horizontal.

The terms "horizontal" and "vertical" are designated with respect to an XY plane defined by several points respectively establishing the contact between a wheel 26 of the wheelbarrow 20 and the feet 25 and 25' of the wheelbarrow with the ground. More precisely, a horizontal axis in the present application is an axis parallel to the XY plane and a vertical axis is an axis orthogonal to the XY plane.

Furthermore, the terms "high" and "low" are defined along the Z axis, a first element arranged higher than a second element being further from the XY plane than said second element.

The bucket 21 is generally a reverse conical frustum shape with rounded edges. It thus comprises a base wall 27 and an assembly of four walls laterally joined together, formed of a front wall 28, a rear wall 29, the terms "front" and "rear" being relative to the advance direction of the wheelbarrow, as well as two side walls 30 and 30'. The assembly of edges at the top of the four walls forms a border 31 marking out the first upper opening 22.

Figure 2:
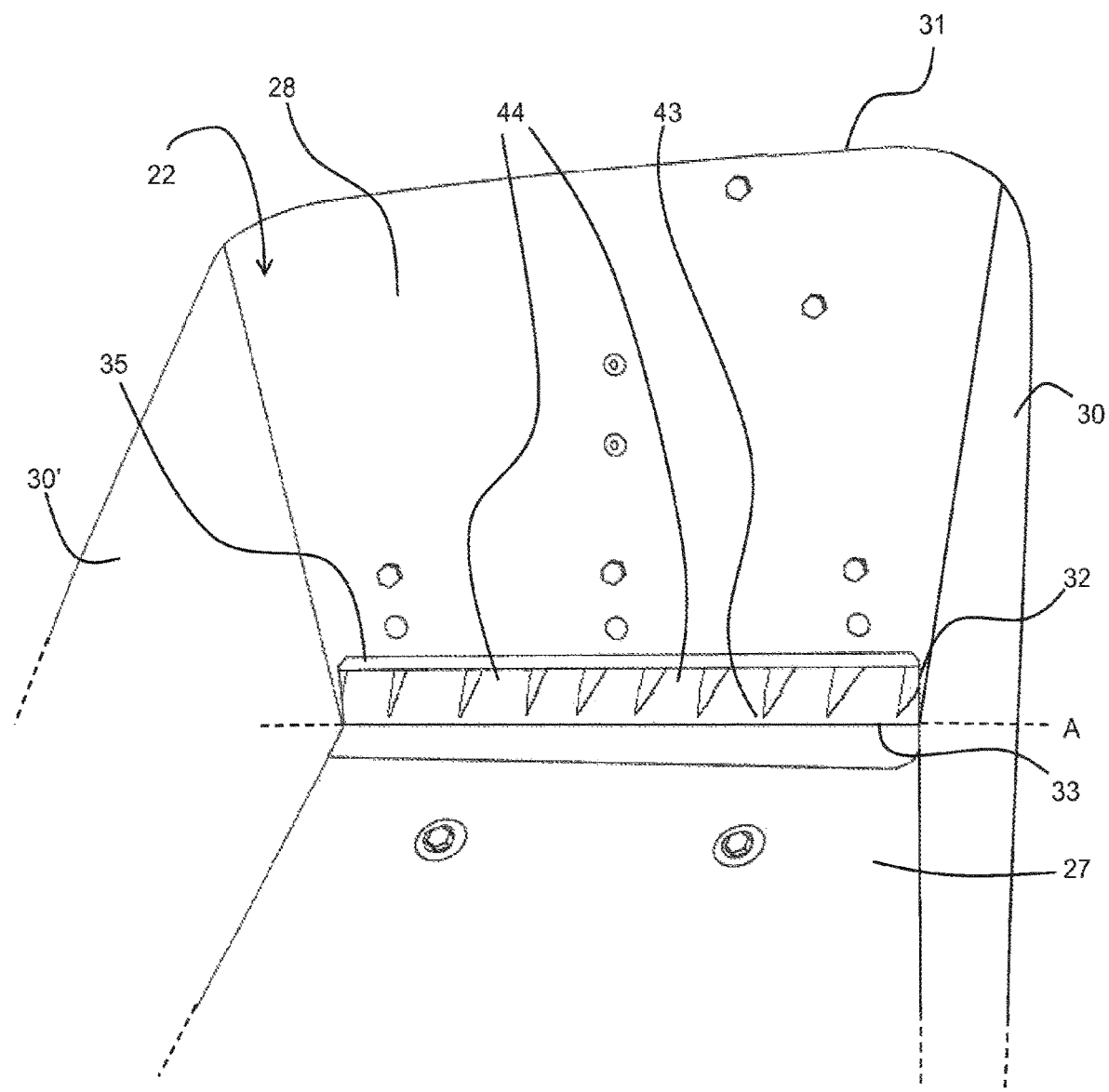
FIG. 2 is a sectional view an interior of a bucket of the wheelbarrow of FIG. 1A.

As shown in FIG. 2, the bucket 21 further comprises a second opening 32 in said base wall 27 and/or in the front wall 28 through which the material is intended to flow. Preferably, the second opening 32 extends longitudinally between the two side walls 30 and 30', according to an axis A parallel to the Y axis (parallel to the transverse axis of the wheelbarrow 20). According to a preferred exemplary embodiment, the second opening 32 extends longitudinally between the two side walls 30 and 30', according to the axis A, along at least one section of the edge 33 marking out the base wall 27 of the front wall 28. According to another exemplary embodiment, the second opening 32 extends longitudinally between the two side walls 30 and 30', according to the axis A and one of the longitudinal edges of the opening is the edge 33.

The wheelbarrow 20 may comprise a grip handle 34 arranged on each shaft 24 and 24', in some embodiments at their end, such that the user of the wheelbarrow 20 can hold the shafts 24 and 24' in a more comfortable fashion at the handles 34.

According to an embodiment of the present disclosure, the wheelbarrow 20 further comprises a closing flap 35 closing the second opening 32.

The closing flap 35 is, for example, a flat rectangular shape extending longitudinally according to a longitudinal axis parallel to the Y axis. According to another example the closing flap 35 is a rounded rectangular shape around an axis parallel to the Y axis and extending longitudinally according to another longitudinal axis parallel to the Y axis.

The closing flap 35 is fixed to the bucket 21 in a freely rotatable manner around an axis B parallel to the Y axis. According to an exemplary embodiment, the closing flap 35 is fixed to the bucket 21 in a freely rotatable manner around the axis B by fixing means comprising at least one longitudinal arm 36 connected by a first end of the arm 36 to an end of the closing flap 35 according to the longitudinal axis of the closing flap 35, and by a second end of the arm 36 to one of the side walls 30 and 30', in a freely rotatable manner around the axis B. In another exemplary embodiment, as shown in FIG. 3, the fixing means comprise two arms 36, each arm 36 being connected respectively to a different end of the length of the closing flap 35 and a different side wall 30 and 30'.

The wheelbarrow 20 also comprises means for controlling the opening of said closing flap 35.

Figure 3:
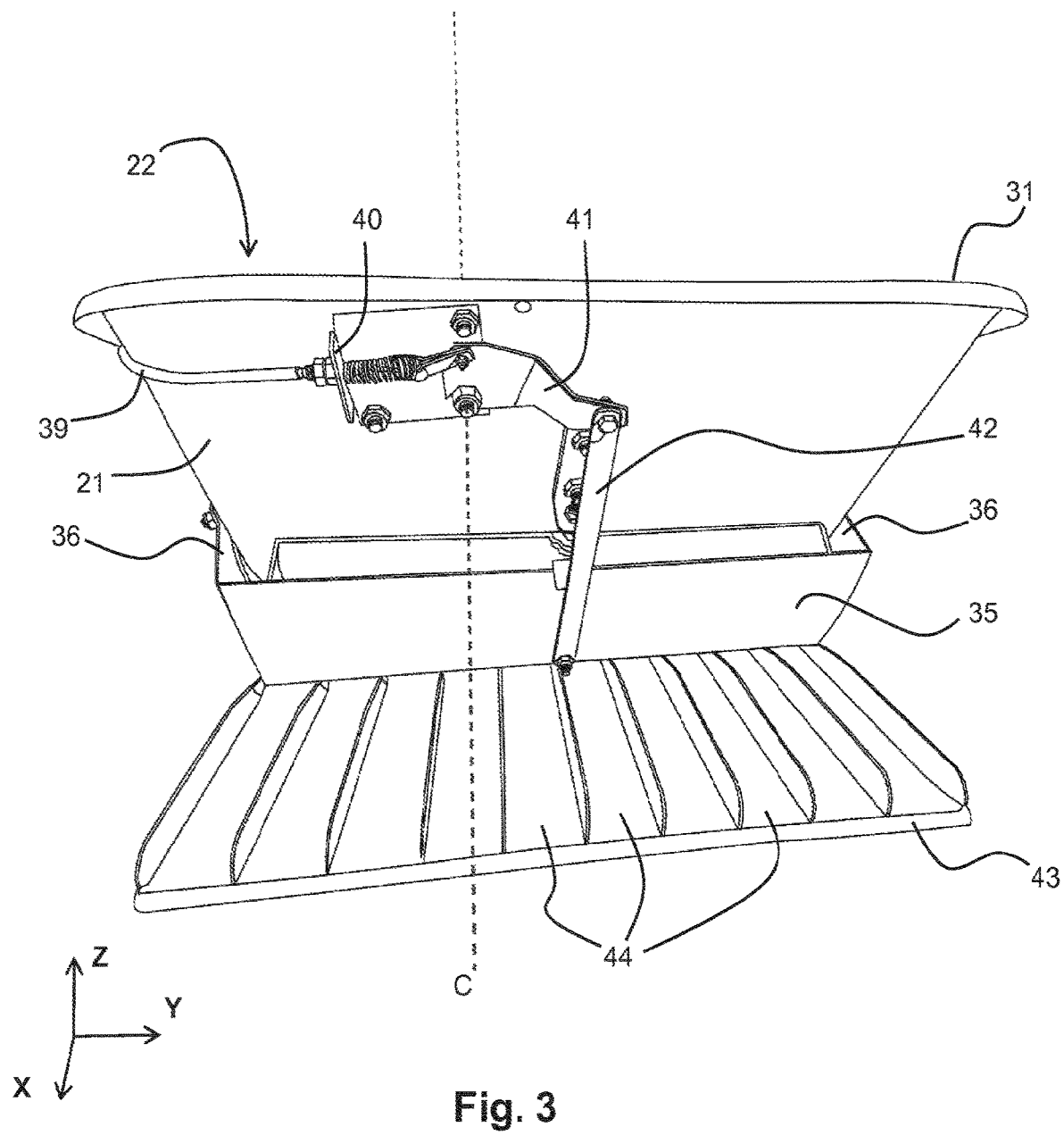
FIG. 3 is a front view the wheelbarrow of FIG. 1A.

As shown in FIGS. 1 and 3, said means for controlling the opening of the closing flap 35 comprise a cable 37 connected to an operable controlling element 38 at a first end of the cable 37 and at the closing flap 35 at a second end of the cable 37.

The operable controlling element 38 shown in FIGS. 1 and 3 is manually operable. In this exemplary embodiment, the operable controlling element is a lever such as those used for bicycle brakes. A Bowden cable system, currently used for bicycle brakes, is moreover used as cable 37 in the present embodiment. In this exemplary embodiment, the operable controlling element 38 is positioned at the end of a shaft 24 in order to be operated manually by the user of the wheelbarrow 20 when they take said wheelbarrow 20 by the shafts 24 and 24'. The operable controlling element 38 is preferably positioned so that it is close to the handle 34 arranged on the shaft 24. The operable controlling element 38 may, for example, be positioned on or under the handle 34.

The cable 37 comprises a flexible sheath 39 surrounding said cable 37, each of the two ends of the sheath 39 being fixed respectively to a stop opening 40 which allows the cable 37 to slide. One of the stops 40 is fixed to the bucket 21 while the other is fixed to the shaft 24 upon which the operable controlling element 38 is positioned.

The connection of the cable 37 to the closing flap 35 is implemented by a set of connecting rods wherein a first connecting rod 41 is connected to a second end of the cable 37 and a second connecting rod 42, said second connecting rod 42 being connected to the closing flap 35, so that when the operable controlling element 38 is operated, the closing flap 35 opens. According to an embodiment, the first connecting rod 41 is fixed to the bucket 21 in a freely rotatable manner around an axis of rotation C. The axis of rotation C may be perpendicular to the front wall 28 of the bucket 21.

When the closing flap 35 is not open, the second opening 32 is closed by said opening flap 35 and the material which is located in the bucket 21 cannot flow through the second opening 32. When the closing flap 35 is open, it does not obstruct the second opening 32 which is then released, which allows the material to flow through the second opening 32.

In an embodiment, and as shown in FIGS. 1 and 3, the wheelbarrow 20 comprises a material distribution plate 43. This plate 43 is positioned under the second opening 32 so that when a material flows gravitationally through the opening 32, said material flows onto the plate 43 along its surface across its width and then flows from the plate 43 towards the surface requiring the application under the wheelbarrow 20 or in front of the wheelbarrow 20. The distribution plate 43 is a generally rectangular shape and extends longitudinally according to a longitudinal axis parallel to the Y axis, under the whole length of the second opening 32. Preferably, the plate 43 extends longitudinally over a length corresponding to the distance between the two side walls 30 and 30'.

According to an embodiment, the distribution plate 43 extends further over its length according to a longitudinal axis parallel to the longitudinal axis of the wheelbarrow 20. Thus, when the wheelbarrow 20 is idle, i.e. the wheel(s) 26 and the feet 25 and 25' are touching the ground, the distribution plate 43 extends substantially horizontally. The plate 43 then extends in width according to an axis parallel to the X axis. In another embodiment, as shown in FIGS. 1 and 3, the distribution plate 43 extends along its width according to a longitudinal axis D sloping in the advance direction of the wheelbarrow 20 with respect to the longitudinal axis of the wheelbarrow 20. The axis D, for example, slopes from a 20° angle to a 45° angle with respect to the longitudinal axis of the wheelbarrow 20.

In an embodiment, the length and width of the plate 43 are equal and the plate is thus generally square shaped.

The plate 43 is fixed to the bucket 21 in a manner which is either reversible or not. In an embodiment, said plate 43 is fixed to the base wall 27 and/or the front wall 28 of the bucket 21. Different fixing means may be used to fix the plate to the bucket 21, for example, by soldering one of the plate 43 edges to the bucket 21, or by means of screwing the plate 43 to the bucket 21.

According to an embodiment, said distribution plate 43 comprises guide channels 44. According to an embodiment, the guide channels 44 extend longitudinally over the plate 43 according to the axes parallel to the width of the plate 43. Said guide channels 44 allow the flow of material on the surface of the plate 43 to be distributed in a homogeneous manner so that said flow of material from the plate 43 towards the surface requiring an application is carried out in a homogeneous manner along the whole length of the plate 43 extended according towards an axis parallel to the Y axis.

Example of Implementation of the Wheelbarrow 20

The bucket 21 of the wheelbarrow 20 is filled with a material, for example a granular material such as gravel. The wheelbarrow 20 is then handled by a user so the wheelbarrow 20 is rolled towards and onto the surface requiring the application of the material. When the wheelbarrow 20 reaches the surface requiring the application, the user operates the operable controlling element 38 while continuing to move forwards onto said surface, thus triggering the opening of the closing flap 35.

Upon operation, the operable controlling element 38 implements a pulling action on the cable 37 which then implements a pulling action on the first connecting rod 41 at the connection between the cable 37 and the first connecting rod 41. The pulling action on the first connecting rod 41 drives the rotation of said first connecting rod 41 around the axis of rotation C. The rotation implemented by the first connecting rod 41 drives a pulling action on the second connecting rod 42 which then implements a pulling action on the closing flap 35, thus causing the opening of the closing flap 35. The opening of the closing flap 35 then allows the material contained in the bucket 21 to be spilled through the second opening 32.

The material then flows over the distribution plate 43. It is noted that the distribution plate 43 extends across its width according to a longitudinal axis D sloping in the advance motion of the wheelbarrow 20 with respect to the longitudinal axis of the wheelbarrow 20. The material then gravitationally flows according to the direction of the width of the plate 43 and along the whole length of the plate 43 in a homogeneous manner thanks to the presence of the guide channels 44. After having travelled the width of the distribution plate 43, the material gravitationally flows in a homogeneous manner from the whole length of the plate 43 towards the surface requiring the application.

The user stops operating the operable controlling element 38 when they want to stop the flow of the material. Stopping this operation causes the second opening 32 to close by the closing flap 35 according to the reverse mechanism used for the opening of the latter. The closing of the second opening 32 prevents the flow of the material present in the bucket 21 through said second opening 32.

Variants of the embodiments of the present disclosure will now be discussed in detail. In a particular embodiment, the operable controlling element 38 is operable according to different positions, each position of said operable controlling element 38 corresponding to an opening position of the closing flap 35 and thus to a different flow rate of the material from the second opening 32.

In a particular embodiment, the wheelbarrow 20 comprises a system for conditioning the flow of the material (not shown) based on the forward speed of the wheelbarrow 20. Such a system may comprise a cylinder extending longitudinally according to an axis of revolution parallel to the Y axis, in the bucket 21, between the side walls 30 and 30', and above the second opening 32 so the material can flow through the opening 32 based on the rotation speed of said cylinder around said axis of revolution, said rotation speed of the cylinder being dependent on the forward speed of the wheelbarrow 20.

In an embodiment, the bucket 21 is detachable in a reversible fashion from the other elements of the wheelbarrow 20.

In a particular embodiment, the wheelbarrow 20 comprises brakes.

In a particular embodiment, the wheelbarrow 20 comprises indicator lights.

In a particular embodiment, the wheelbarrow 20 comprises a system for vibrating the bucket 21 and/or the distribution plate 43 to facilitate the flow of the material through the second opening 32. This is particularly advantageous when the material is damp or sticky.

In a particular embodiment, the wheelbarrow 20 comprises an electrical or thermal system to aid the motor function of the wheelbarrow 20.

In a particular embodiment, the wheelbarrow 20 comprises an impact wall positioned in front of the distribution plate 43 according to the longitudinal axis of the wheelbarrow 20, so that when the material to be spread flows from the distribution plate 43 towards the ground, said material collides with the impact wall before touching the ground. Such a wall may be a generally rectangular shape and attached to the plate 43 by reversible fixing means.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the present invention in which an exclusive property or privilege is claimed are defined as follows:

1. A wheelbarrow for spreading a material, comprising:
   a bucket configured to contain at least one material, the bucket comprising a base wall, a front wall, a rear wall, two side walls, a first upper opening, a second opening positioned in at least one of the base wall and the front wall and through which the material is configured to flow;
   a closing flap configured to close the second opening;
   means for controlling the position of the closing flap; and
   a distribution plate having a substantially rectangular shape and extending longitudinally along a longitudinal axis parallel to a transverse axis of the wheelbarrow, the distribution plate extending under the entire length of the second opening and positioned such that material flowing gravitationally through the second opening travels along the distribution plate towards an application surface exterior to the bucket of the wheelbarrow, wherein the material is distributed across a width of the distribution plate as the material travels along the distribution plate.

2. The wheelbarrow of claim 1, wherein the second opening extends longitudinally between the two side walls in a direction of the longitudinal axis.

3. The wheelbarrow of claim 1, wherein the means for controlling the position of the closing flap comprises a cable having a first end connected to an operable controlling element and a second end connected to the closing flap.

4. The wheelbarrow of claim 3, wherein the cable is connected to the closing flap by first and second connecting rods, wherein the first connecting rod is connected to the second end of the cable, and wherein the second connecting rod is connected to the closing flap such that when the operable controlling element is operated, the closing flap opens the second opening.

5. The wheelbarrow of claim 3, wherein the operable controlling element is manually operable.

6. The wheelbarrow of claim 3, comprising at least two shafts, wherein the operable controlling element is positioned on one of the two shafts.

7. The wheelbarrow of claim 3, wherein the operable controlling element is a lever.

8. The wheelbarrow of claim 1, wherein the closing flap is rotatably coupled to the bucket and configured to rotate about an axis parallel to a transverse axis of the wheelbarrow.

9. The wheelbarrow of claim 1, wherein the distribution plate comprises guide channels configured to substantially evenly distribute the material across the width of the distribution plate as the material travels along the distribution plate.

\* \* \* \* \*